United States Patent
Morrow et al.

(10) Patent No.: US 7,201,184 B2
(45) Date of Patent: Apr. 10, 2007

(54) PRESSURE PROTECTION VALVE

(75) Inventors: Jereme C. Morrow, Grapevine, TX (US); Waikhew Ung, Katy, TX (US); Eddie D. Huckaby, Denton, TX (US); Mark T. Grimm, Dunlap, IL (US)

(73) Assignee: Paccar Inc, Bellevue, WA (US)

(*) Notice: Subject to any disclaimer, the term of this patent is extended or adjusted under 35 U.S.C. 154(b) by 453 days.

(21) Appl. No.: 10/758,060

(22) Filed: Jan. 15, 2004

(65) Prior Publication Data
US 2005/0155652 A1 Jul. 21, 2005

(51) Int. Cl.
*F16K 3/24* (2006.01)
(52) U.S. Cl. ............... 137/508; 137/536; 137/543.19
(58) Field of Classification Search .......... 137/508, 137/536, 538, 540, 512.1, 543.19
See application file for complete search history.

(56) References Cited

U.S. PATENT DOCUMENTS

| | | | | |
|---|---|---|---|---|
| 2,623,725 A | | 12/1952 | Sands ................... 251/118 |
| 3,093,155 A | * | 6/1963 | Dawes ................... 137/269 |
| 3,675,487 A | | 7/1972 | Mueller .................. 73/414 |
| 3,741,241 A | | 6/1973 | Jackson .................. 137/504 |
| 3,782,410 A | * | 1/1974 | Steuby ................... 137/496 |
| 3,796,228 A | | 3/1974 | Bedo et al. |
| 4,128,209 A | * | 12/1978 | Johnson .................. 239/583 |
| 4,161,996 A | * | 7/1979 | Dolejsi .................. 181/230 |
| 4,195,658 A | | 4/1980 | Dierksmeier et al. ...... 137/462 |
| 4,403,627 A | * | 9/1983 | Bradley .................. 137/508 |
| 4,431,027 A | | 2/1984 | Sabina, Jr. ............... 137/574 |
| 4,605,039 A | | 8/1986 | Johnson et al. .......... 137/460 |
| 4,880,030 A | | 11/1989 | Terry .................... 137/460 |
| 5,007,454 A | * | 4/1991 | Lee, II .................. 137/508 |
| 5,117,860 A | | 6/1992 | Horner, Jr. .............. 137/512.1 |
| 5,215,113 A | | 6/1993 | Terry .................... 137/460 |
| 5,291,916 A | | 3/1994 | Kloosterman et al. ...... 137/112 |
| 5,474,105 A | | 12/1995 | Able et al. .............. 137/462 |

(Continued)

FOREIGN PATENT DOCUMENTS

DE 954 469 12/1956

(Continued)

OTHER PUBLICATIONS

*Pressure Protection Valves*, Copyright 2002 by PAI, 1 page.

(Continued)

*Primary Examiner*—Stephen M. Hepperle
(74) *Attorney, Agent, or Firm*—Sidley Austin LLP

(57) ABSTRACT

A valve is provided having a housing with an inlet and an outlet. Within the confines of the housing is a fluid flow path that allows for fluid communication between the inlet and the outlet. The valve includes a valve element that is movable to and from a position where it blocks fluid communication along the fluid flow path, thereby closing the valve. The valve also includes a resilient member provided in a chamber of the valve that is fluidly sealed from the fluid flow path. The resilient member urges the valve element to move to the position for closing the valve. When the pressure of fluid entering the inlet exceeds a preselected amount, the pressure of the fluid overcomes the urging of the resilient member and the valve element moves towards a position that allows fluid communication along the fluid flow path, thereby opening the valve.

22 Claims, 4 Drawing Sheets

U.S. PATENT DOCUMENTS

| | | | |
|---|---|---|---|
| 5,613,518 A | 3/1997 | Rakieski | 137/513.5 |
| 5,704,390 A * | 1/1998 | Leon | 137/508 |
| 6,173,738 B1 * | 1/2001 | Opara et al. | 137/508 |
| 6,443,180 B1 | 9/2002 | Samuelson et al. | 137/460 |
| 6,470,508 B2 | 10/2002 | Turner | 4/541.1 |
| 2002/0036015 A1 | 3/2002 | Miyajima et al. | |

FOREIGN PATENT DOCUMENTS

| | | |
|---|---|---|
| DE | 298 23 474 U1 | 7/1999 |
| WO | WO 02/46651 A1 | 6/2002 |

OTHER PUBLICATIONS

*Compressed Air Systems*, Chapter 16, TM 5-692-2, 8 pages.

AME, *Efficient Compressed Air Systems*, SEDA, Energy Savings Manual, 2000, 4 pages.

Midland™—"Pressure Relief Valves", *Instructions for Series A-1000 through A-37000*, DOVER Resources Company, Doc No. INST A1000/A37000, Rev. 1.2 Jan. 2003, 16 pages.

* cited by examiner

PRESSURE PROTECTION VALVE

FIELD OF THE INVENTION

In general, this invention relates to handling fluid materials including primarily gases, but not excluding the handling of other flowable materials. More specifically, this invention relates to an apparatus for controlling fluid flow, such as a pressure protection valve or check valve suitable for use in a pressurized-fluid system.

SUMMARY OF THE INVENTION

According to the present invention, a valve is provided which comprises a housing having an inlet and an outlet fluidly connected by a fluid flow path. A valve element is provided that is movable between a first position and a second position. When the valve element is in the first position, it blocks fluid communication along the fluid flow path. The valve also includes a resilient member fluidly sealed from the fluid flow path. The resilient member urges the valve element from its second position to its first position such that the resilient member moves to its first position when the pressure of fluid entering the inlet is below a threshold amount.

BRIEF DESCRIPTION OF THE DRAWINGS

The present invention is illustrated by way of example and is not limited by the figures of the accompanying drawings, in which like reference numbers indicate similar parts.

DETAILED DESCRIPTION OF THE INVENTION

Figure 1:
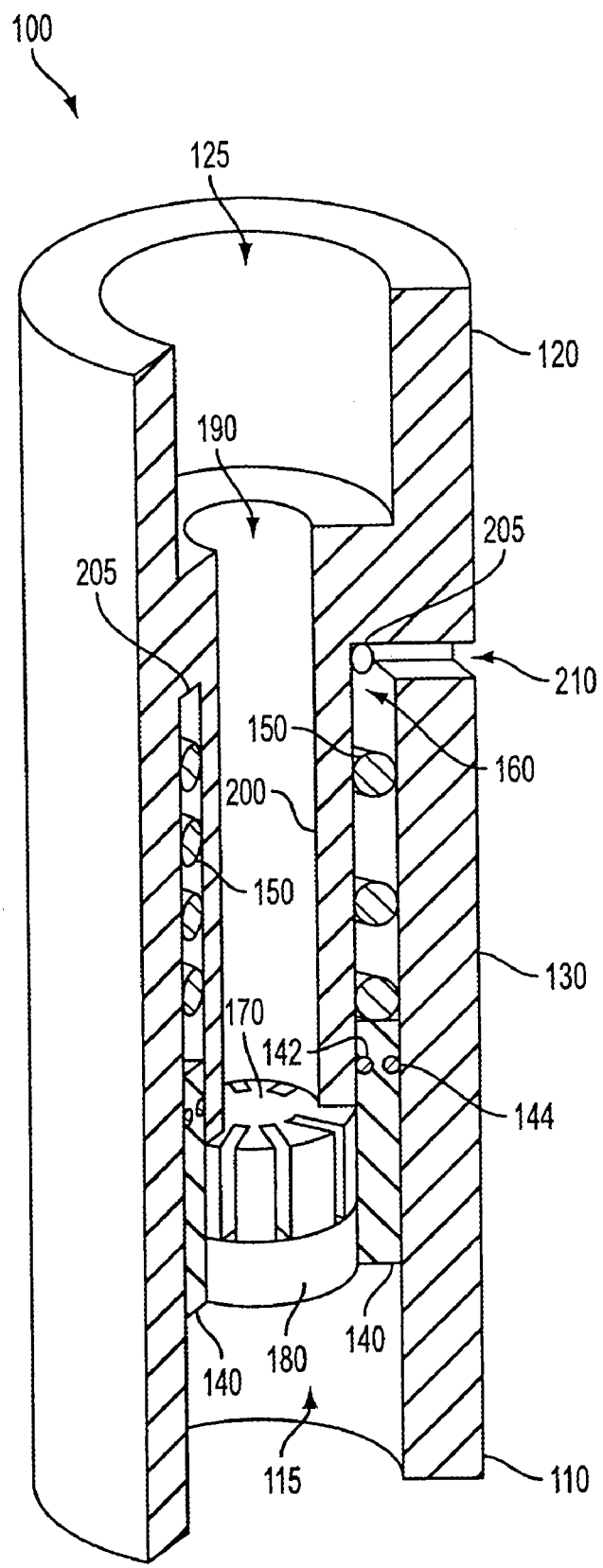
FIG. 1 shows a partially-sectioned perspective view of an inline pressure protection valve made according to the principles of the present invention illustrating an annular piston thereof in a first position for blocking fluid flow.

Referring now to the drawings and FIG. 1 in particular, a valve 100 of the present invention is shown in a partially-sectioned perspective view. The valve 100 is a pressure protection valve configured to be placed inline with a compressed-fluid system. The valve 100 includes an inlet 110 for receiving pressurized fluid into an antechamber 115 and an outlet 120 for exhausting the pressurized fluid from an outflow path 125. The combination of the antechamber 115 and the outflow path 125 constitutes a fluid flow path from the inlet 110 to the outlet 120. The size and shape of the inlet 110 and outlet 120 can vary depending on application to allow for connection inline with a pressurized fluid system.

Figure 2:
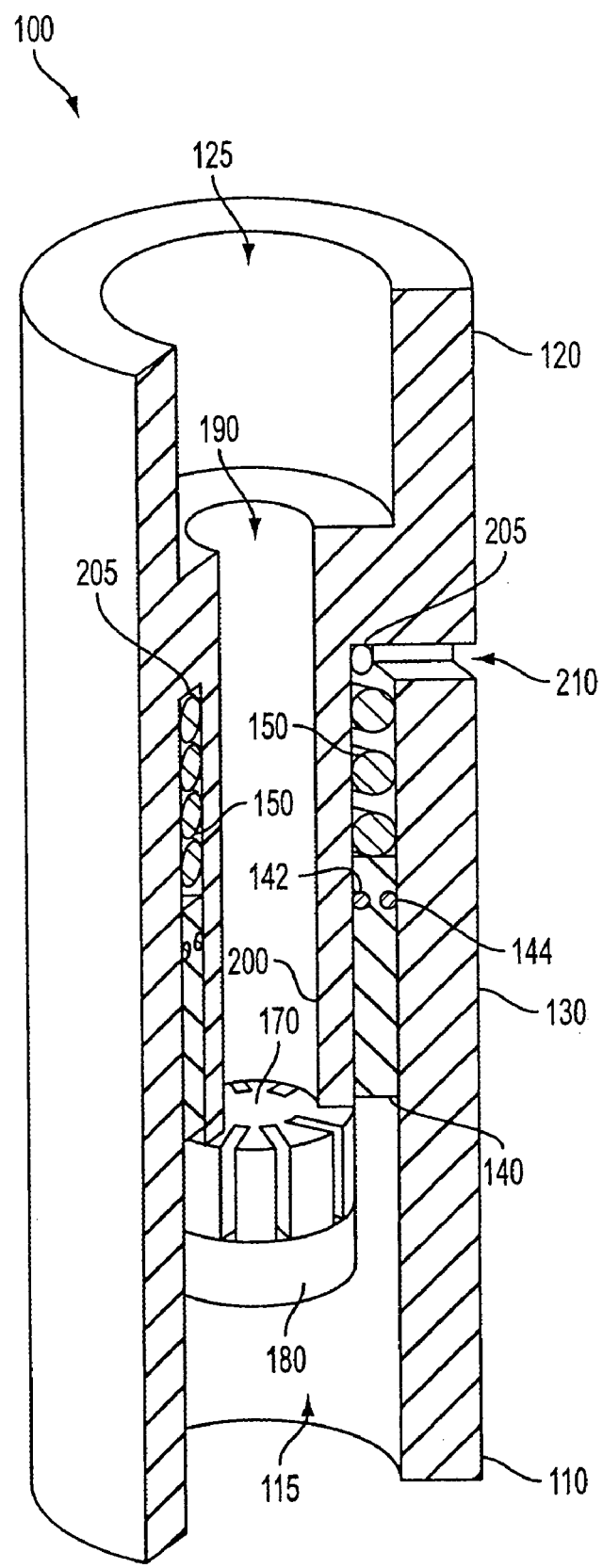
FIG. 2 shows a partially-sectioned perspective view of the inline pressure protection valve of FIG. 1 illustrating the annular piston thereof in a second position for allowing fluid flow.

The valve 100 has a housing 130, which extends in a longitudinal direction between the inlet 110 and the outlet 120. The valve 100 includes an annular piston 140, which serves as a valve element between the antechamber 115 and the outflow path 125, for moving in the longitudinal direction within the housing 130 to open and close the valve 100. A spring 150 serves as a resilient member for biasing the annular piston 140 towards a first position, which is a closed-valve position as shown in FIG. 1. The spring 150 is located in a spring-guide chamber 160, and is held in place by being fixed at one end (i.e., upper end as oriented in FIG. 1) to the housing 130 and fixed at an opposite end (i.e., lower end as oriented in FIG. 1) to the annular piston 140. When fluid pressure at the inlet 110 increases beyond a certain predetermined threshold level, it overcomes the bias of the spring 150 causing the annular piston 140 to move towards a second position, which is an open-valve position as shown in FIG. 2.

Note that the valve 100 includes a grooved plate 170, which serves as an apertured member, and a blocking plate 180, which serves as a blocking member. When the annular piston 140 is in the closed-valve position, the blocking plate 180 and the annular piston 140 block fluid flow between the antechamber 115 and the outflow path 125, thereby preventing fluid from flowing from the inlet 110 to the outlet 120. On the other hand, when the annular piston 140 is in the open-valve position, radial grooves in the grooved plate 170 provide for fluid communication between the antechamber 115 and the outflow path 125, thereby allowing fluid-flow from the inlet 110 to the outlet 120.

Figure 3:
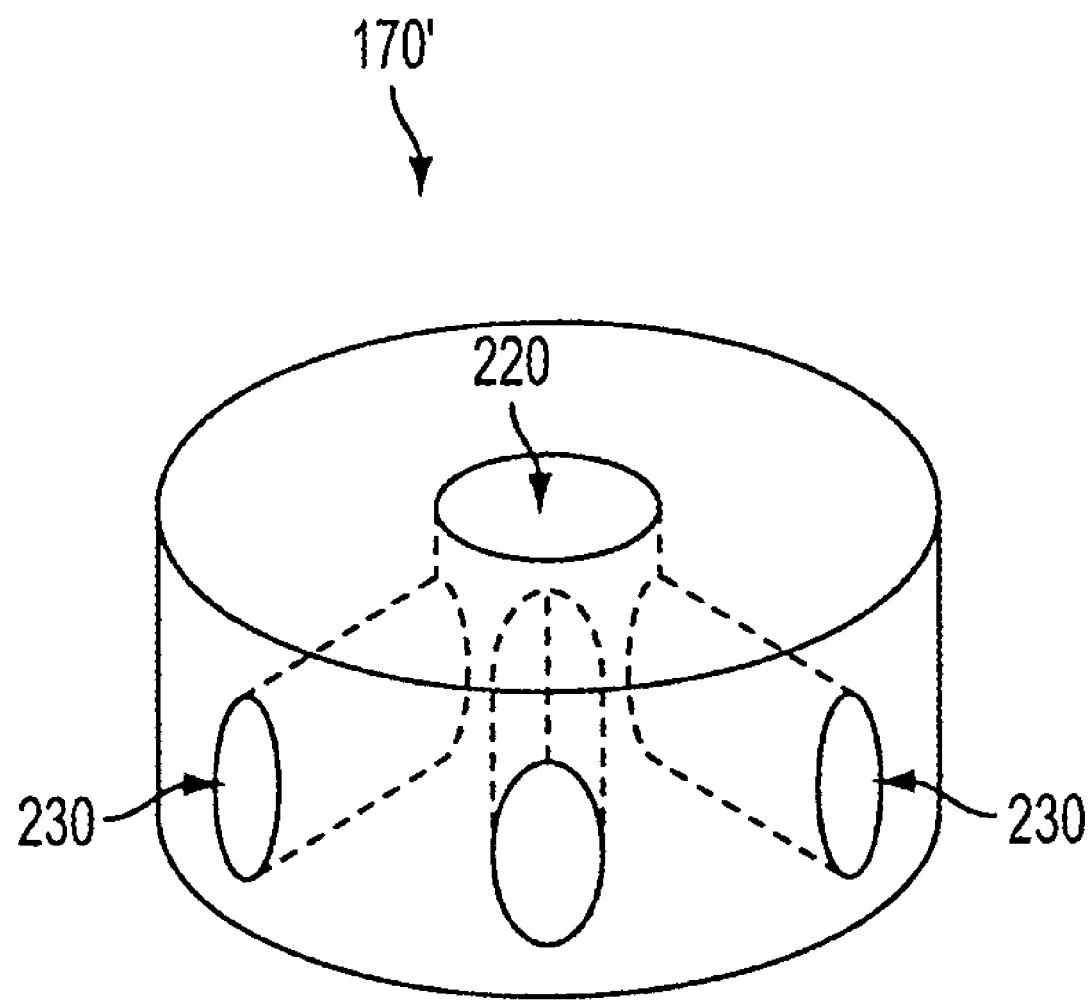
FIG. 3 shows a perspective view of an alternative component of the inline pressure protection valve according to the principles of the present invention.

It is contemplated that the grooved plate 170 can be provided in alternate forms, as long as a fluid path is provided between the antechamber 115 and the outflow path 125. For example, the grooved plate 170 can be replaced with a drilled plate 170', which is shown in FIG. 3. The drilled plate 170' is an example of an alternate form of an apertured member of the present invention. The drilled plate 170' has a central aperture 220 that is in fluid communication with the outflow path 125. The drilled plate 170' also includes one or more radial apertures 230, each in fluid communication with the central aperture 220 and the antechamber 115. When the annular piston 140 is in the open-valve position, the radial apertures 230 in combination with the central aperture 220 provide for fluid communication between the antechamber 115 and the outflow path 125, thereby allowing for fluid communication between the inlet 110 and the outlet 120. On the other hand, when the annular piston 140 is in the closed-valve position, the annular piston 140 blocks the radial apertures 230, thereby preventing fluid-flow between the antechamber 115 and the outflow path 125.

In addition, it is further contemplated that if the central aperture 220 is formed such that it does not extend all the way through the drilled plate 170', then it is possible to use the drilled plate 170' in place of the combination of the grooved plate 170 and the blocking plate 180.

Referring again to FIGS. 1 and 2, an inner bore 190, which is a portion of the outflow path 125, is defined by an inner side of a partition 200. The spring-guide chamber 160 is a space formed between an outer side of the partition 200 and an inner side of the housing 130. The spring-guide chamber 160 is bound at one end (upper end as oriented in FIGS. 1 and 2) by a bridge portion 205, which extends between the housing 130 and the partition 200. The spring-guide chamber 160 is bound at another end (lower end as oriented in FIGS. 1 and 2) by the annular piston 140. The annular piston 140 is fitted between the inner side of the housing 130 and the outer side of the partition 200. It is desirable to fluidly seal the spring-guide chamber 160 from fluid in the fluid flow path between the inlet 110 and the outlet 120. It is contemplated that there are numerous ways of ensuring an adequate seal. In the present embodiment, inner and outer o-ring seals 142 and 144 are used. As shown in FIGS. 1 and 2, the inner o-ring seal 142 is provided between an inner side of the annular piston 140 and the outer side of the partition 200, and the outer o-ring seal 144 is provided between an outer side of the annular piston 140 and the inner side of the housing 130. The seals 142 and 144 combined with the annular piston 140 fluidly seal the spring-guide chamber 160 from the fluid flow path between the inlet 110 and the outlet 120, including the antechamber 115 and the outflow path 125.

While the spring-guide chamber 160 is fluidly isolated from the fluid flow path within the valve 100, it is desirable to allow fluid to enter and escape from the spring-guide chamber 160 as the size of the spring-guide chamber 160 changes with the movement of the annular piston 140. For example, when the valve 100 opens, the annular piston 140 compresses the spring 150 causing a reduction in the amount of space within the spring-guide chamber 160 (note the spring-guide chamber 160 shown in FIG. 2 is smaller than the spring-guide chamber 160 shown in FIG. 1). Therefore, if there is no way for a fluid in the spring-guide chamber 160 to escape while the spring 150 is compressing, then the fluid in the spring-guide chamber 160 would also need to be compressed to allow for movement of the annular piston 140. Similarly, if there is no way for fluid to enter the spring-guide chamber 160, the fluid in the spring-guide chamber 160 would have to expand as the spring 150 is decompressing. So, in order to avoid this situation, a vent 210 is provided in the housing 130 for allowing fluid to flow between the spring-guide chamber 160 and the outside of the valve 100. On the other hand, it is contemplated that the vent 210 could be eliminated if the effect of the fluid trapped in the spring-guide chamber 160 is considered in the design of the valve 100, for example if the spring 150 is selected with consideration given to the force necessary for compression of the fluid trapped in the spring-guide chamber 160.

The operation of the valve 100 will now be described. When the valve is closed as shown in FIG. 1 and a fluid is forced into the antechamber 115 through the inlet 110, pressure is applied to the annular piston 140. When this pressure exceeds a certain threshold amount, for example 70 psi, the force caused by this pressure on the annular piston 140 begins to overcome the opposing force on the annular piston 140 from the spring 150. At this point, the annular piston 140 begins to compress the spring 150 and move towards the open-valve position shown in FIG. 2. As the fluid pressure in the antechamber 115 continues to increase, the annular piston 140 continues to move towards the open-valve position, gradually uncovering the grooved plate 170. Once the fluid pressure in the antechamber 115 reaches a second threshold level, for example 120 psi, the force resulting from the fluid pressure is sufficient to move the annular piston 140 all the way to the open-valve position. At the open-valve position, valve 100 is fully open and the fluid conduits, i.e., grooves, in the groove-plate 170 are most completely uncovered by the annular piston 140.

If, while the valve 100 is open, fluid pressure in the antechamber 115 is reduced—for example, below 120 psi staying with the above example—then the force of the spring 150 acting on the annular piston 140 begins to overcome the opposing force caused by the fluid pressure in the antechamber 115. In this situation, the annular piston 140 begins to gradually move from the open-valve position shown in FIG. 2 towards the closed-valve position shown in FIG. 1. While the annular piston 140 moves towards the closed-valve position, the annular piston 140 gradually covers and blocks the fluid conduits, i.e., grooves, in the grooved plate 170. At some point, if the fluid pressure in the antechamber 115 is sufficiently reduced—for example, below 70 psi still staying with the above example—then the annular piston 140 is moved under the force of the spring 150 to the closed-valve position and the valve 100 is fully closed. Thus, unless the fluid pressure in the antechamber 115 is sufficient to generate a force on the annular piston 140 such that the force can overcome the opposing force on the annular piston 140 from the spring 150, the flow of fluid from the inlet 110 to the outlet 120 is blocked and the valve 100 is closed.

It is particularly worth noting that the valve 100 according to the present invention is less sensitive than prior valves to downstream pressure, i.e., pressure at the outlet 120 of the valve. This is because the pressure at the outlet 120 and within the outflow path 125 does not act on the annular piston 140. Instead, as described above, the annular piston 140 moves according to a force applied from pressure within the antechamber 115, i.e., inlet pressure, and an opposing force from the spring 150. Since the spring 150 is fluidly sealed from the fluid flow path between the inlet 110 and the outlet 120, including the outflow path 125, the pressure within the outflow path 125 does not contribute to the opposing force from the spring 150 on the annular piston 140. Thus, it will be appreciated that the valve 100 operates to open and close according to variations in the inlet pressure rather than changes in the differential pressure between the outlet 120 and the inlet 110.

Figure 4:
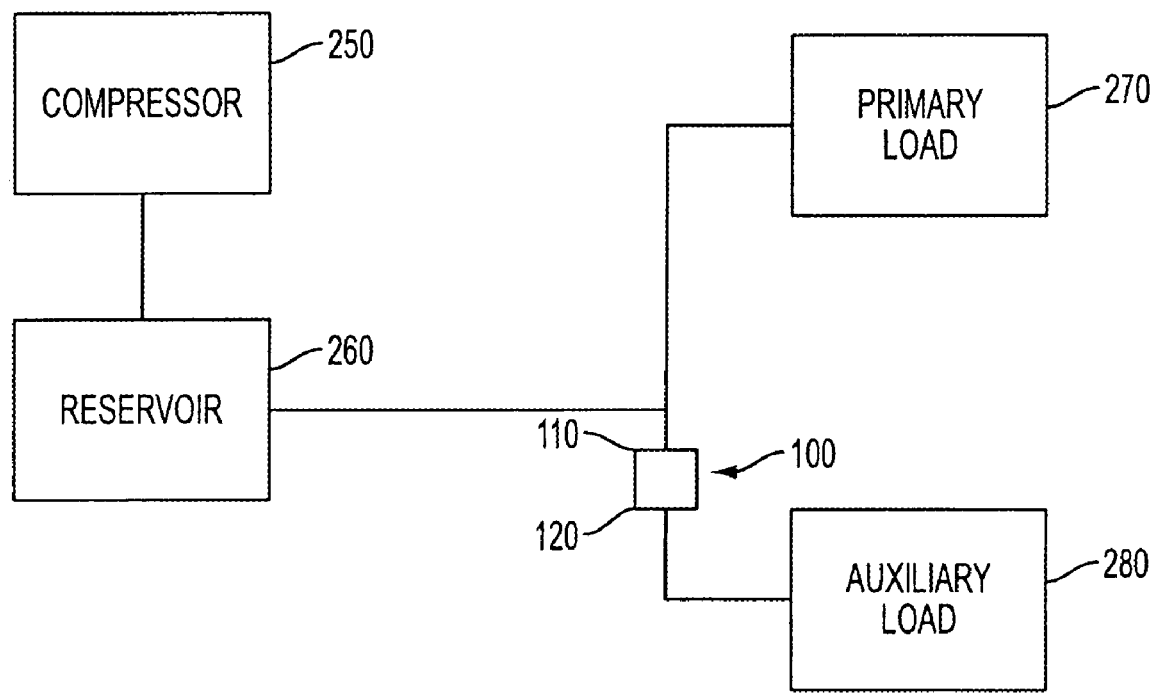
FIG. 4 shows a block diagram of a compressed air system incorporating the inline pressure valve according to the present invention.

FIG. 4 shows a schematic block diagram of a compressed air system incorporating the valve 100. The compressed air system includes a compressor 250 for compressing air into a reservoir 260. The compressor 250 can be controlled by a governor (not shown) for monitoring the pressure of the air stored in the reservoir 260. The reservoir 260 serves as a source of compressed air for a primary load 270 and an auxiliary load 280.

As an example, the compressed air system shown in FIG. 4 can be embodied as a vehicle compressed air system where the primary load 270 is an air brake that uses the compressed air from the reservoir 260 for slowing and stopping the rotation of the wheels of the vehicle, while the auxiliary load 280 is an air-ride seat where air is supplied to a driver's seat for height adjustment. In such a system, it is desirable to isolate the loads so that a leak in the auxiliary load 280 does not affect the function of the primary load 270. Otherwise, an air leak in the auxiliary load 280 could result in an over-depletion of compressed air from the reservoir 260, an overworking of the compressor 250 trying to bring the air pressure in the reservoir 260 up to a necessary level, and/or failure of the primary load 270 to function due to inadequate air pressure supplied from the reservoir 260.

The valve 100 is used as a protective measure in the compressed air system shown in FIG. 4 as follows. The air pressure in the reservoir 260 is reflected in the air pressure within the air supply lines from the reservoir 260 to the loads 270 and 280. Thus, the air pressure in the reservoir 260 is detected at the valve 100, disposed inline with the air supply line from the reservoir 260 to the auxiliary load 280. If the amount of pressure at the inlet 110 of the valve 100 is above a predetermined amount, the pressure of the air overcomes the opposing force of the spring 150 within the valve 100 acting on the valve's annular piston 140 and the valve 100 is open, allowing the flow of air therethrough to the auxiliary load 280. On the other hand, if an air leak or over-usage occurs in the auxiliary load 280, the air pressure within the reservoir 260 and the air supply lines from the reservoir 260 to the loads 270 and 280 will begin to drop as air escapes. As the pressure drops and approaches the predetermined amount, the valve 100 will begin to close as the force of the valve's spring 150 on the annular piston 140 overcomes the diminishing opposing force of the air pressure. Upon reduction of the air pressure to the predetermined amount, the valve 100 will be closed, effectively stopping any further loss of air from the reservoir 260. Ideally, the predetermined pressure at which the valve 100 closes will be higher than the minimum amount of pressure necessary for proper function of the primary load 270. This would allow the primary load 270 to continue normal function despite failure or over-use of the auxiliary load 280.

Although the present invention has been fully described by way of preferred embodiments, one skilled in the art will appreciate that other embodiments and methods are possible without departing from the spirit and scope of the present invention.

What is claimed is:

1. A valve comprising:
a housing having an inlet and an outlet;
a cylindrical inner member fixedly disposed within the housing to form an annular slot therebetween, the cylindrical inner member having a closed upstream end, an open downstream end, and a plurality of radial openings near the upstream end:
a valve element disposed within the annular slot and movable between a first position and a second position, wherein the valve element blocks fluid communication between the inlet and the outlet by blocking the plurality of radial openings while in the first position;
a resilient member, fluidly sealed from the inlet, for urging the valve element from its second position to its first position such that the valve element moves to its first position when the pressure of fluid entering the inlet is below a threshold amount.

2. A valve according to claim 1, wherein the valve element allows fluid communication along a fluid flow path through the plurality of radial openings while in the second position.

3. A valve according to claim 1, wherein the cylindrical inner member comprises an apertured member and a fluid flow path from the inlet to the outlet includes an aperture in the apertured member.

4. A valve according to claim 3, wherein the valve element blocks the aperture in the apertured member while in the first position, thereby blocking fluid communication along the fluid flow path.

5. A valve according to claim 1, wherein the annular slot and valve element form a chamber for housing the resilient member, wherein the chamber is fluidly sealed from the fluid flow path.

6. A valve according to claim 5, wherein the volume of the chamber varies as the valve element moves between the first position and the second position.

7. A valve according to claim 6, further comprising a vent for providing fluid communication between the chamber and the exterior of the valve.

8. A valve according to claim 1, wherein the housing is a cylindrical housing and the cylindrical inner member is disposed within the valve concentric with the housing.

9. A valve according to claim 8, wherein the valve element is an annular element disposed between the partition and the housing.

10. A valve according to claim 9, wherein the resilient element is disposed between the cylindrical inner member and the housing within a chamber defined by the cylindrical inner member, the housing, and the valve element.

11. A valve according to claim 10, further comprising an apertured member fixed to the cylindrical inner member, wherein the valve element is positioned between the apertured member and the housing while in the first position.

12. A valve comprising:
a housing having an inlet and an outlet;
an antechamber extending into the housing from the inlet;
an outflow path extending into the housing from the outlet;
a partition disposed between the antechamber and the outflow path, and having a plurality of radial openings:
a valve element moveable between a first position interrupting fluid communication between the antechamber and the outflow path through the plurality of radial openings and a second position allowing fluid communication between the antechamber and the outflow path through the plurality of radial openings;
a chamber fluidly sealed from the outflow path; and
a resilient member, disposed within the chamber, for urging the valve element to shift from its second position to its first position such that the valve element moves to its first position when the pressure of fluid in the antechamber is below a threshold amount.

13. A valve according to claim 12, wherein the chamber is fluidly sealed from the antechamber.

14. A valve according to claim 13, wherein the chamber is a space between the partition, the housing, and the valve element.

15. A valve according to claim 14, wherein the volume of the chamber changes as the valve element moves.

16. A valve according to claim 12, wherein the partition comprises an apertured member having an aperture for providing fluid communication between the antechamber and the outflow path.

17. A valve according to claim 12, further comprising a vent for providing fluid communication between the chamber and the exterior of the valve.

18. A valve according to claim 12, wherein the resilient member is a spring.

19. A valve comprising:
a housing, having an inlet and an outlet, extending in a longitudinal direction between the inlet and the outlet;
an antechamber in fluid communication with the inlet;
an outflow path in fluid communication with the outlet;
an inner portion disposed within the housing so as to define an annulus therebetween, and having a plurality of radial openings for providing fluid communication from the antechamber to the outflow path:
a valve element moveable in the longitudinal direction between a first position adjacent the plurality of radial openings thereby completely interrupting fluid communication between the antechamber and the outflow path and a second position allowing fluid communication between the antechamber and the outflow path; and
a resilient member for urging the valve element from its second position towards its first position such that the valve element moves to its first position when the pressure of fluid entering the inlet is below a preselected amount.

20. A valve according to claim 19, further comprising a chamber that is fluidly sealed from the antechamber and the outflow path, wherein the resilient member is disposed within the chamber.

21. A valve according to claim 20, wherein the chamber extends in the longitudinal direction, and wherein the length of the chamber in the longitudinal direction varies according to the position of the valve element.

22. A valve according to claim 21, wherein said length of the chamber in the longitudinal direction decreases as the valve element moves from the first position towards the second position.

* * * * *